(12) United States Patent
Lee

(10) Patent No.: US 12,140,444 B2
(45) Date of Patent: Nov. 12, 2024

(54) VEHICLE ROUTE GUIDANCE APPARATUS AND METHOD THEREOF

(71) Applicants: Hyundai Motor Company, Seoul (KR); Kia Corporation, Seoul (KR)

(72) Inventor: Dae Kun Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 17/896,936

(22) Filed: Aug. 26, 2022

(65) Prior Publication Data

US 2023/0228583 A1 Jul. 20, 2023

(30) Foreign Application Priority Data

Jan. 20, 2022 (KR) .......................... 10-2022-0008642

(51) Int. Cl.
*G01C 21/36* (2006.01)
*G01S 19/42* (2010.01)

(52) U.S. Cl.
CPC .......... *G01C 21/3605* (2013.01); *G01S 19/42* (2013.01)

(58) Field of Classification Search
CPC .. G01C 21/206; G01C 21/30; G01C 21/3407; G01C 21/3605; G01C 21/367;
(Continued)

(56) References Cited

U.S. PATENT DOCUMENTS

| 2010/0217517 A1* | 8/2010 | Oohashi | G01C 21/30 701/533 |
| 2011/0184644 A1* | 7/2011 | McBurney | G01S 19/47 701/532 |

(Continued)

FOREIGN PATENT DOCUMENTS

| EP | 2541198 A1 * | 1/2013 | ........... G01C 21/165 |
| EP | 2541203 A1 * | 1/2013 | ............. G01C 21/12 |

(Continued)

OTHER PUBLICATIONS

Kao, Wei-Wen. "Integration of GPS and dead-reckoning navigation systems." In Vehicle Navigation and Information Systems Conference, 1991, vol. 2, pp. 635-643. IEEE, 1991. (https://ieeexplore.ieee.org/stamp/stamp.jsp?arnumber=1623672) (Year: 1991).*

(Continued)

*Primary Examiner* — Atul Trivedi
(74) *Attorney, Agent, or Firm* — Morgan, Lewis & Bockius LLP

(57) ABSTRACT

A vehicle route guidance apparatus and a method thereof includes a positioning module that calculates a position of a vehicle and at least one processor that controls the positioning module. The at least one processor is configured to verify whether the vehicle enters a specified section, in a state where a navigation application is run, calculates accuracy of a position calculated by the positioning module, in a state where the vehicle enters the specified section, performs determination of whether to calculate a final position of the vehicle using detailed map data of the specified section, according to a result of determining the accuracy of the position calculated by the positioning module, calculates a final position of the vehicle by the positioning module, according to the determination, and performs route guidance on the specified section based on the final position.

16 Claims, 5 Drawing Sheets

(58) Field of Classification Search
CPC ............ G01C 21/3685; G01C 21/3689; G01C 21/383; G01C 21/3844; G01C 21/3863; G01S 19/14; G01S 19/42; G01S 19/48; G01S 5/015
USPC ......................................................... 701/410
See application file for complete search history.

(56) References Cited

U.S. PATENT DOCUMENTS

| | | | | |
|---|---|---|---|---|
| 2011/0208424 | A1* | 8/2011 | Hirsch | G01C 21/165 |
| | | | | 701/532 |
| 2011/0257882 | A1* | 10/2011 | McBurney | G01S 19/47 |
| | | | | 701/532 |
| 2012/0323481 | A1* | 12/2012 | Bhattiprolu | G01C 21/3407 |
| | | | | 701/445 |
| 2014/0132767 | A1* | 5/2014 | Sonnabend | G06V 20/63 |
| | | | | 348/148 |
| 2016/0371607 | A1* | 12/2016 | Rosen | G08G 1/141 |
| 2021/0116579 | A1* | 4/2021 | Rezaei | G01S 19/25 |
| 2021/0213962 | A1* | 7/2021 | Pishehvari | G01S 13/89 |
| 2021/0333411 | A1* | 10/2021 | Gum | G01S 19/21 |
| 2021/0372796 | A1* | 12/2021 | Lin | G01C 21/20 |
| 2021/0377697 | A1* | 12/2021 | Yerramalli | G01S 5/0257 |
| 2022/0155404 | A1* | 5/2022 | Kumar | G01S 5/0236 |
| 2022/0171010 | A1* | 6/2022 | Hsu | G01S 19/48 |
| 2022/0307858 | A1* | 9/2022 | Tateishi | G01C 21/3407 |
| 2022/0317312 | A1* | 10/2022 | Sharma | H04W 4/40 |
| 2023/0123087 | A1* | 4/2023 | Singh | G01C 21/206 |
| | | | | 342/385 |

FOREIGN PATENT DOCUMENTS

| | | | | |
|---|---|---|---|---|
| EP | 3137923 B1 * | 8/2021 | ............ | G01S 19/48 |
| WO | WO-2020191146 A1 * | 9/2020 | ............ | G01B 17/02 |
| WO | WO-2021242886 A1 * | 12/2021 | ........... | G01S 5/0205 |

OTHER PUBLICATIONS

Ojeda, L., & Borenstein, J. (May 2007). Non-GPS navigation with the personal dead-reckoning system. In Unmanned systems technology ix (vol. 6561, pp. 110-120). SPIE. (https://doi.org/10.1117/12.718691) (Year: 2007).*

Mezentsev, Oleg, Gerard Lachapelle, and Jussi Collin. "Pedestrian dead reckoning—A solution to navigation in GPS signal degraded areas?" Geomatica 59, No. 2 (2005): 175-182. (https://citeseerx.ist.psu.edu/document?repid=rep1&type=pdf&doi=e22bba081817d6174b64f77f27b4a5c2f06be705) (Year: 2005).*

* cited by examiner

VEHICLE ROUTE GUIDANCE APPARATUS AND METHOD THEREOF

CROSS-REFERENCE TO RELATED APPLICATION

The present application claims priority to Korean Patent Application No. 10-2022-0008642, filed on Jan. 20, 2022, the entire contents of which is incorporated herein for all purposes by this reference.

BACKGROUND OF THE PRESENT DISCLOSURE

Field of the Present Disclosure

The present disclosure relates to a vehicle route guidance apparatus and a method thereof, and more particularly, relates to technologies of guiding a driver along a route using map information.

DESCRIPTION OF RELATED ART

In general, there is a trend that a navigation system with various functions for user convenience is provided in a car. The navigation system provides a function for providing traffic information to a current position or a destination of the vehicle to improve convenience of the driver.

The navigation system calculates a current position of the vehicle using global navigation satellite system (GNSS) information or dead reckoning (DR) information. At the instant time, the navigation system compares the calculated position of the vehicle with map information to display the current position of the vehicle on a map.

The navigation system may perform positioning using DR information in an area where GNSS information is not received and may distinguish movement between floors using the DR information. However, because a sensor used to obtain DR information in a general navigation system for vehicle is often a low-cost product, a large dilution of precision (DOP) may occur when the vehicle travels in a state where GNSS information is not received for a long time.

Furthermore, although precise map information is obtained using expensive equipment, it is difficult to perform detailed route guidance because the calculated vehicle position is inaccurate. Thus, it is difficult for the general navigation system to accurately perform road guidance in a parking lot.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle route guidance apparatus configured for determining whether there is a vehicle in a parking lot and accurately performing route guidance and a method thereof.

Another aspect of the present disclosure provides a vehicle route guidance apparatus configured for performing route guidance using map data in a target parking lot where precise map data is constructed and a method thereof.

Another aspect of the present disclosure provides a vehicle route guidance apparatus configured for determining and/or correcting a current position of the vehicle based on map data and performing route guidance and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle route guidance apparatus may include a positioning module that calculates a position of a vehicle and at least one processor operatively connected to the positioning module and configured to control the positioning module. The at least one processor may verify whether the vehicle enters a predetermined section, in a state where a navigation application is run, may determine accuracy of a position calculated by the positioning module, in a state where the vehicle enters the predetermined section, may perform determination of whether to calculate a final position of the vehicle using map data of the predetermined section, according to a result of determining the accuracy of the position calculated by the positioning module, may calculate the final position of the vehicle by the positioning module, according to the determination, and may perform route guidance of the vehicle on the predetermined section based on the final position.

In an exemplary embodiment of the present disclosure, the predetermined section may include at least one of a parking lot, an inside of a building, or a global navigation satellite system (GNSS) non-reception area.

In an exemplary embodiment of the present disclosure, the vehicle route guidance apparatus may further include a memory. The at least one processor is configured to determine whether the map data of the predetermined section is stored in the memory, in response that the vehicle enters the predetermined section, and may deliver the map data including a position of the vehicle to the positioning module to determine the final position, when it is determined that the map data of the predetermined section is stored in the memory. The map data may include link information of the predetermined section.

In an exemplary embodiment of the present disclosure, the at least one processor is configured to determine the accuracy, based on a dilution of precision (DOP) of the position calculated by the positioning module and may calculate the final position using the map data by the positioning module, when the DOP of the position calculated by the positioning module is greater than a threshold.

In an exemplary embodiment of the present disclosure, the at least one processor is configured to determine the accuracy, based on a DOP of the position calculated by the positioning module and may calculate the position calculated by the positioning module as the final position, when the DOP of the position calculated by the positioning module is less than or equal to a threshold.

In an exemplary embodiment of the present disclosure, the at least one processor is configured to calculate the position of the vehicle, using at least one of global navigation satellite system (GNSS) information or dead reckoning (DR) information by the positioning module.

In an exemplary embodiment of the present disclosure, the at least one processor is configured to calculate the position of the vehicle using the GNSS information when accuracy of the GNSS information is greater than or equal to a predetermined level, by the positioning module and may calculate the position of the vehicle using the DR information when the accuracy of the GNSS information is less than the predetermined level, by the positioning module.

In an exemplary embodiment of the present disclosure, the at least one processor is configured to transmit the final position from the positioning module to the navigation application and may perform the route guidance based on the final position transmitted to the navigation application.

In an exemplary embodiment of the present disclosure, the at least one processor is configured to calculate the position of the vehicle irrespective of whether the navigation application is run, by the positioning module, and may transmit the calculated position of the vehicle from the positioning module to the navigation application, irrespective of whether the navigation application is run, to perform map matching in the navigation application.

In an exemplary embodiment of the present disclosure, the map data may include at least one of entry information, exit information, or passage information of the predetermined section. The at least one processor is configured to perform the route guidance on the predetermined section, based on at least one of a final destination, the entry information, the exit information, or the passage information, in response to an input for setting the final destination.

According to an aspect of the present disclosure, a vehicle route guidance method may include verifying, by at least one processor, whether a vehicle enters a predetermined section, in a state where a navigation application is run, determining, by the at least one processor, accuracy of a position calculated by a positioning module which calculates a position of the vehicle, in a state where the vehicle enters the predetermined section, performing, by the at least one processor, determination of whether to calculate a final position of the vehicle using map data of the predetermined section, according to a result of determining the accuracy of the position calculated by the positioning module, determining, by the at least one processor, the final position of the vehicle by the positioning module, according to the determination, and performing, by the at least one processor, route guidance of the vehicle on the predetermined section based on the final position.

In an exemplary embodiment of the present disclosure, the predetermined section may include at least one of a parking lot, an inside of a building, or a global navigation satellite system (GNSS) non-reception area.

In an exemplary embodiment of the present disclosure, the vehicle route guidance method may further include determining, by the at least one processor, whether the map data of the predetermined section is stored in a memory, in response that the vehicle enters the predetermined section and delivering, by the at least one processor, the map data including a position of the vehicle to the positioning module to calculate the final position, when the at least one processor concludes that the map data of the predetermined section is stored in the memory. The map data may include link information of the predetermined section.

In an exemplary embodiment of the present disclosure, the determining of the final position of the vehicle by the positioning module by the at least one processor may include determining, by the at least one processor, the accuracy, based on a DOP of the position calculated by the positioning module, and determining, by the at least one processor, the final position using the map data by the positioning module, when the DOP of the position calculated by the positioning module is greater than a threshold.

In an exemplary embodiment of the present disclosure, the determining of the final position of the vehicle by the positioning module by the at least one processor may include determining, by the at least one processor, the accuracy, based on an DOP of the position calculated by the positioning module, and determining, by the at least one processor, the position calculated by the positioning module as the final position, when the DOP of the position calculated by the positioning module is less than or equal to a threshold.

In an exemplary embodiment of the present disclosure, the determining of the accuracy of the position calculated by the positioning module by the at least one processor may include determining, by the at least one processor, the accuracy of the position calculated using at least one of global navigation satellite system (GNSS) information or dead reckoning (DR) information by the positioning module.

In an exemplary embodiment of the present disclosure, the determining of the accuracy of the position calculated by the positioning module by the at least one processor may include determining, by the at least one processor, the accuracy of the position calculated using the GNSS information when accuracy of the GNSS information is greater than or equal to a predetermined level, by the positioning module, and determining, by the at least one processor, the accuracy of the position calculated using the DR information when the accuracy of the GNSS information is less than the predetermined level, by the positioning module.

In an exemplary embodiment of the present disclosure, the performing of the route guidance of the vehicle on the predetermined section based on the final position by the at least one processor may include transmitting, by the at least one processor, the final position from the positioning module to the navigation application and performing, by the at least one processor, the route guidance based on the final position transmitted to the navigation application.

In an exemplary embodiment of the present disclosure, the vehicle route guidance method may further include determining, by the at least one processor, the position of the vehicle irrespective of whether the navigation application is run, by the positioning module, and transmitting, by the at least one processor, the calculated position of the vehicle from the positioning module to the navigation application, irrespective of whether the navigation application is run, to perform map matching in the navigation application.

In an exemplary embodiment of the present disclosure, the map data may include at least one of entry information, exit information, or passage information of the predetermined section. The performing of the route guidance of the vehicle on the predetermined section based on the final position may include performing, by the at least one processor, the route guidance on the predetermined section, based on at least one of a final destination, the entry information, the exit information, or the passage information, in response to an input for setting the final destination.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
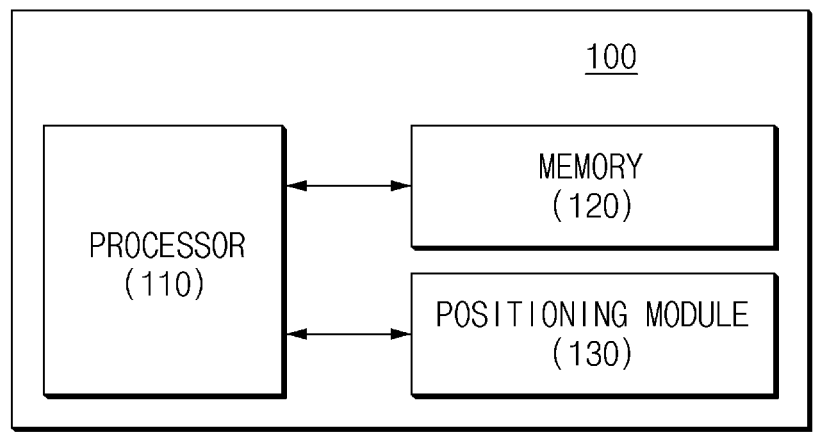
FIG. 1 is a block diagram of a vehicle route guidance apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, and FIG. 5.

FIG. 1 is a block diagram of a vehicle route guidance apparatus 100 according to an exemplary embodiment of the present disclosure. Hereinafter, the vehicle route guidance apparatus 100 may be referred to as a route guidance apparatus 100.

Referring to FIG. 1, the route guidance apparatus 100 according to various exemplary embodiments of the present disclosure may include a processor 110, a memory 120, and a positioning module 130. In various exemplary embodiments of the present disclosure, the route guidance apparatus 100 may include an additional component other than the components shown in FIG. 1, or may omit at least one of the components shown in FIG. 1.

According to an exemplary embodiment of the present disclosure, the processor 110 may be electrically connected to the memory 120 and the positioning module 130 and may electrically control the respective components. The processor 110 may be an electrical circuit which executes instructions of software and may perform a variety of data processing and determination described below.

The processor 110 may include, for example, an electronic control unit (ECU), a micro controller unit (MCU), or another sub-controller, which is loaded into the vehicle.

According to an exemplary embodiment of the present disclosure, the processor 110 may execute determination and data processing about control and/or communication of at least one other component of the route guidance apparatus 100 using instructions stored in the memory 120. Detailed contents associated with an operation of the processor 110 will be described below with reference to FIG. 2, FIG. 3 and FIG. 4.

According to an exemplary embodiment of the present disclosure, the memory 120 may store data, an algorithm, and/or the like necessary for an operation of the route guidance apparatus 100.

According to an exemplary embodiment of the present disclosure, the memory 120 may store information received from various sensors or systems to collect state information of the vehicle or driving information of the vehicle. For example, the memory 120 may store information detected from various sensors such as an ultrasonic sensor, a scanner, and/or a camera and may store information received from at least one or more vehicle management systems and/or control systems such as a battery management system, a lane departure warning system, and/or a collision warning system.

According to an exemplary embodiment of the present disclosure, the memory 120 may store map data of a specified section. According to an exemplary embodiment of the present disclosure, the specified section may include at least one of a parking lot, an inside of a building, or a global navigation satellite system (GNSS) no-reception area. For example, map data of a parking lot may include map data where pieces of information of passages in the parking lot are recorded in detail.

Herein, the memory 120 may include a storage medium such as a random access memory (RAM), a static RAM (SRAM), a read-only memory (ROM), a programmable ROM (PROM), and/or an electrically erasable PROM (EEPROM).

According to an exemplary embodiment of the present disclosure, the positioning module 130 may calculate a position of the vehicle. For example, the positioning module 130 may calculate a current position of the vehicle which is traveling. For another example, the positioning module 130 may calculate a current position of the vehicle which is in a stop state.

According to an exemplary embodiment of the present disclosure, the positioning module 130 may calculate a position of the vehicle, based on at least one of GNSS information or dead reckoning (DR) information.

According to an exemplary embodiment of the present disclosure, the positioning module 130 may calculate a position of the vehicle using the GNSS information, when accuracy of the GNSS information is greater than or equal to a predetermined level, and may calculate a position of the vehicle using the DR information, when the accuracy of the GNSS information is less than the predetermined level.

According to an exemplary embodiment of the present disclosure, the positioning module 130 may calculate a position of the vehicle using detailed map data. For example, the positioning module 130 may calculate a position of the vehicle using the map data stored in the memory 120. For another example, the positioning module 130 may calculate a position of the vehicle based on map data obtained from the outside of the vehicle through a communication device.

Figure 2:
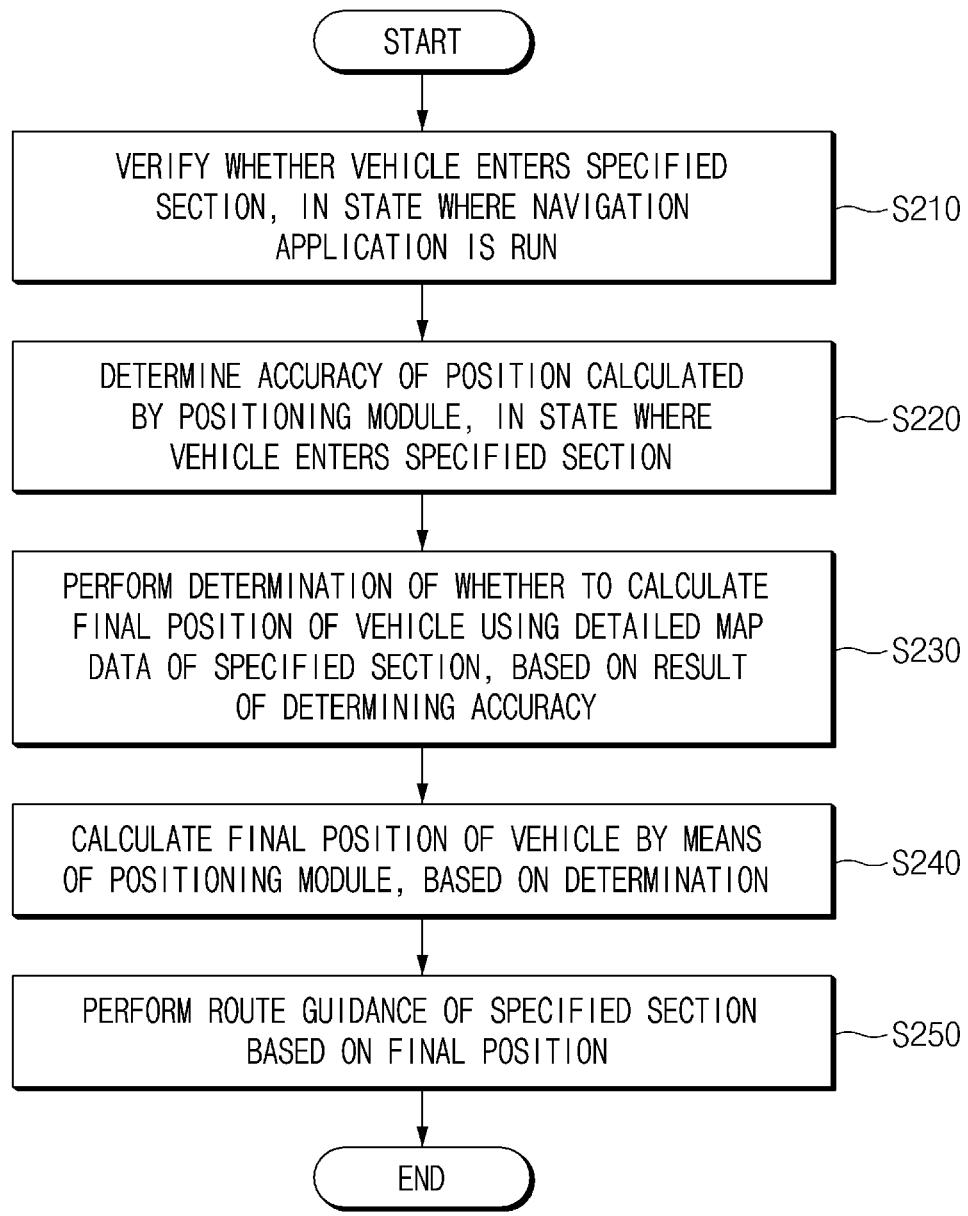
FIG. 2 is a flowchart illustrating a vehicle route guidance method according to an exemplary embodiment of the present disclosure.

FIG. 2 is a flowchart illustrating a vehicle route guidance method according to an exemplary embodiment of the present disclosure. Operations S210 to S240 in an exemplary embodiment below may be sequentially performed, but are not necessarily sequentially performed. For example, an order of the respective operations may be changed, and at least two operations may be performed in parallel.

Referring to FIG. 2, in a vehicle route guidance apparatus and a method thereof according to an exemplary embodiment of the present disclosure, in S210, a processor may verify whether a vehicle enters a specified section, in a state where a navigation application is run.

According to an exemplary embodiment of the present disclosure, the processor is configured to determine whether the vehicle enters the specified section based on position information of the vehicle, which is transmitted from a positioning module.

According to an exemplary embodiment of the present disclosure, the processor may obtain a current position of the vehicle from map information, based on the position information of the vehicle, which is transmitted from the positioning module.

For example, the processor may obtain a current position of the vehicle from map information by map matching of displaying coordinates of the vehicle, which are transmitted from the positioning module, on a map.

According to an exemplary embodiment of the present disclosure, the processor is configured to determine whether the vehicle enters the specified section, based on the current position of the vehicle.

According to an exemplary embodiment of the present disclosure, the specified section may include at least one of a parking lot, an inside of a building, or a GNSS no-reception area. In detail, for example, the specified section may include a parking lot of at least one of an apartment, a shopping mall, a department store, or a store.

According to an exemplary embodiment of the present disclosure, in S220, the processor is configured to determine accuracy of the position calculated by the positioning module, in the state where the vehicle enters the specified section.

According to an exemplary embodiment of the present disclosure, the processor is configured to determine accuracy of the position of the vehicle, which is calculated using GNSS information or DR information by the positioning module, in the state where the vehicle enters the specified section.

According to an exemplary embodiment of the present disclosure, the processor is configured to determine accuracy of the position of the vehicle, which is determined by the positioning module based on the accuracy of the GNSS information.

According to an exemplary embodiment of the present disclosure, the processor is configured to determine accuracy of the position of the vehicle, which is calculated by the positioning module, based on a duration when the position is calculated using the DR information.

According to an exemplary embodiment of the present disclosure, the accuracy of the calculated position of the vehicle may be calculated with regard to a dilution of precision (DOP), accuracy specifications of a sensor, or the like.

According to an exemplary embodiment of the present disclosure, the processor is configured to determine accuracy based on an estimated DOP of the position calculated by the positioning module. According to an exemplary embodiment of the present disclosure, the processor may compare the estimated DOP of the position calculated by the positioning module with a threshold to determine accuracy. According to an exemplary embodiment of the present disclosure, the threshold may be a previously set value.

According to an exemplary embodiment of the present disclosure, in S230, the processor is configured to determine whether to calculate a final position of the vehicle using detailed map data of the specified section, according to a result of determining the accuracy.

According to an exemplary embodiment of the present disclosure, when it is determined that the estimated DOP of the position calculated by the positioning module is greater than the threshold, the processor is configured to determine to calculate the final position of the vehicle using the detailed map data of the specified section.

According to an exemplary embodiment of the present disclosure, when it is determined that the estimated DOP of the position calculated by the positioning module is greater than the threshold, the processor is configured to determine to calculate the final position of the vehicle using detailed map data including the position of the vehicle, which is delivered to the positioning module.

For example, the detailed map data delivered to the positioning module may include link information of the specified section and coordinates of a link where the vehicle is currently traveling.

According to an exemplary embodiment of the present disclosure, when it is determined that the estimated DOP of the position calculated by the positioning module is less than or equal to the threshold, the processor is configured to determine to calculate the final position of the vehicle without using the detailed map data of the specified section.

According to an exemplary embodiment of the present disclosure, when it is determined that the estimated DOP of the position determined by the positioning module is less than or equal to the threshold, the processor is configured to calculate the final position using the calculated result of the positioning module.

According to an exemplary embodiment of the present disclosure, in S240, the processor is configured to calculate the final position of the vehicle by the positioning module, based on the determination of whether to calculate the final position of the vehicle using the detailed map data of the specified section.

According to an exemplary embodiment of the present disclosure, when it is determined that the estimated DOP of the position calculated by the positioning module is greater than the threshold, the processor is configured to calculate the final position of the vehicle using the detailed map data of the specified section.

According to an exemplary embodiment of the present disclosure, when it is determined that the estimated DOP of the position calculated by the positioning module is greater than the threshold, the processor is configured to calculate the final position of the vehicle using the detailed map data including the position of the vehicle, which is delivered to the positioning module.

For example, the processor is configured to calculate the final position of the vehicle using the coordinates of the link where the vehicle is currently traveling, which are delivered to the positioning module.

According to an exemplary embodiment of the present disclosure, when it is determined that the estimated DOP of the position calculated by the positioning module is less than or equal to the threshold, the processor is configured to calculate the final position of the vehicle using the calculated result of the positioning module. For example, the processor is configured to calculate a position calculated using GNSS information and/or DR information as the final position of the vehicle by the positioning module.

Meanwhile, "greater than the threshold" or "less than or equal to the threshold" described above is a criterion capable of being set if necessary, and is referred to as an example for convenience of description in conjunction with the present disclosure. However, it is obvious that only "greater than/less than or equal to" which is described above or will be described below is not limited to the present disclosure and "greater than or equal to/less than" is not excluded.

According to an exemplary embodiment of the present disclosure, in S250, the processor is configured to perform route guidance for the specified section based on the final position.

According to an exemplary embodiment of the present disclosure, the processor is configured to transmit the final position from the positioning module to a navigation application and may perform route guidance on the specified section based on the final position transmitted to the navigation application.

According to an exemplary embodiment of the present disclosure, the processor may receive an input for setting a final destination, in a state where the navigation application is run.

According to an exemplary embodiment of the present disclosure, the processor is configured to perform route guidance on the specified section based on the final position, using at least one of the final destination, entry information of the specified section, exit information of the specified section, or passage information of the specified section, in response to the input for setting the final destination.

According to the exemplary embodiment described above, marketability of the vehicle route guidance apparatus according to an exemplary embodiment of the present disclosure may be improved by guiding a driver to a parking position along the final destination.

Furthermore, according to the exemplary embodiment described above, the vehicle route guidance apparatus according to an exemplary embodiment of the present disclosure may obtain an accurate vehicle position in a parking lot and may effectively guide the driver to an exit of the parking lot.

According to an exemplary embodiment of the present disclosure, the processor is configured to output route guidance on the specified section as voice guidance or a sound by a speaker.

According to an exemplary embodiment of the present disclosure, the processor may visually output route guidance on the specified section on a display.

Figure 3:
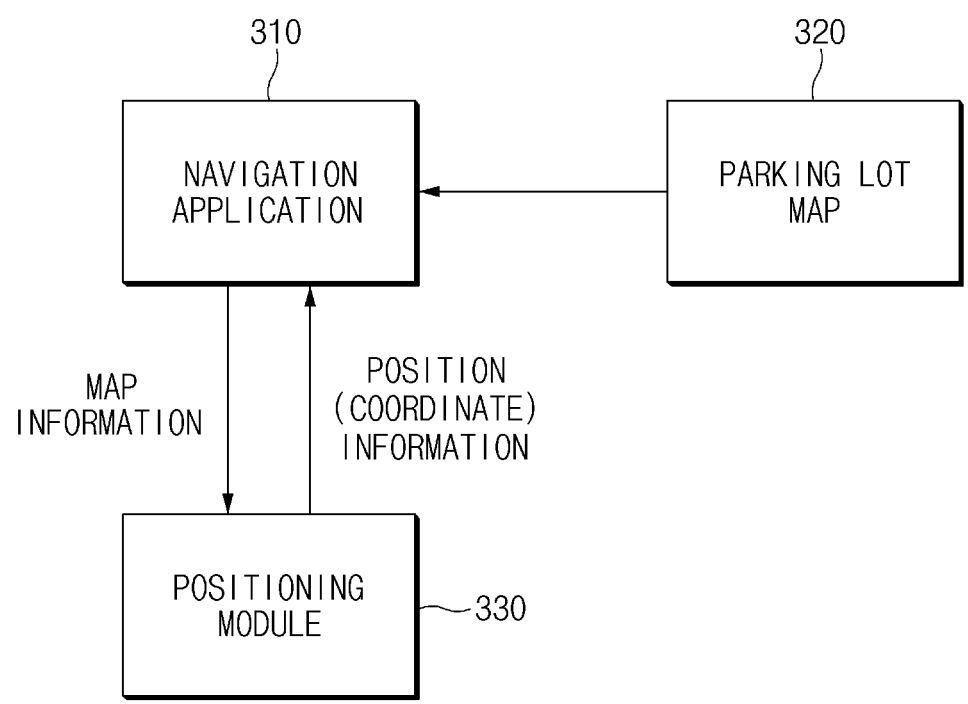
FIG. 3 illustrates vehicle route guidance in a vehicle route guidance apparatus and a method thereof according to an exemplary embodiment of the present disclosure.

FIG. 3 illustrates vehicle route guidance in a vehicle route guidance apparatus and a method thereof according to an exemplary embodiment of the present disclosure. Contents, which are duplicated with or correspond to contents described above in conjunction with contents of FIG. 3, may be briefly described or omitted.

According to an exemplary embodiment of the present disclosure, vehicle route guidance in the vehicle route guidance apparatus and the method thereof may be performed using a navigation application 310, a parking lot map 320, and a positioning module 330. In various exemplary embodiments of the present disclosure, the vehicle route guidance in the vehicle route guidance apparatus and the method thereof may be performed by use of an additional component other than the components shown in FIG. 3 or omitting at least one of the components shown in FIG. 3. In the present disclosure, the parking lot map 320 may be referred to as map data, detailed map data, a high definition map, map information, or the like.

According to an exemplary embodiment of the present disclosure, the navigation application 310 may determine whether a vehicle enters a parking lot in vehicle route guidance.

According to an exemplary embodiment of the present disclosure, when it is determined that the vehicle enters the parking lot, the navigation application 310 may determine whether a current position of the vehicle is included in the parking lot map 320.

For example, the parking lot map 320 may include high definition map information. The navigation application 310 may determine whether the current position of the vehicle is included in a section including high definition map information.

According to an exemplary embodiment of the present disclosure, the navigation application 310 may obtain position information of the vehicle from the positioning module 330.

For example, the navigation application 310 may perform a map matching operation of obtaining position coordinates of the vehicle which is currently traveling from the positioning module 330 and displaying the obtained position coordinates on a map.

According to an exemplary embodiment of the present disclosure, the navigation application 310 may deliver map information to the positioning module 330.

For example, the navigation application 310 may deliver coordinates of a link where the vehicle is currently traveling to the positioning module 330, using link information of the parking lot map 320.

According to an exemplary embodiment of the present disclosure, the navigation application 310 may perform route guidance based on the finally calculated position information.

For example, the navigation application 310 may perform a guidance operation in a parking lot based on the final position of the vehicle, which is obtained from the positioning module 330.

According to an exemplary embodiment of the present disclosure, the parking lot map 320 may be stored in a memory in vehicle route guidance. Alternatively, according to another exemplary embodiment of the present disclosure, the parking lot map 320 may be obtained from the outside through a communication device.

According to an exemplary embodiment of the present disclosure, the parking lot map 320 may include a high definition map where a link in a parking lot is constructed. In detail, the parking lot map 320 may include map data where pieces of information of passages in the parking lot are recorded in detail.

According to an exemplary embodiment of the present disclosure, the parking lot map 320 may be delivered to the navigation application 310 to be used for vehicle route guidance.

According to an exemplary embodiment of the present disclosure, the positioning module 330 may calculate a position of the vehicle in vehicle route guidance. For example, the positioning module 330 may calculate a current position of the vehicle which is traveling. For another example, the positioning module 330 may calculate a current position of the vehicle which is in a stop state.

According to an exemplary embodiment of the present disclosure, the positioning module 330 may calculate a current position of the vehicle, using at least one of GNSS information or DR information. According to an exemplary embodiment of the present disclosure, when accuracy of the GNSS information is greater than or equal to a predetermined level, the positioning module 330 may calculate a current position of the vehicle using the GNSS information. According to an exemplary embodiment of the present disclosure, when the accuracy of the GNSS information is less than the predetermined level, the positioning module 330 may calculate a current position of the vehicle using only the DR information.

According to an exemplary embodiment of the present disclosure, when it is determined that accuracy of the current position of the vehicle is greater than or equal to the predetermined level using at least one of the GNSS information or the DR information, the positioning module 330 may determine the calculated current position of the vehicle as a final position.

According to an exemplary embodiment of the present disclosure, the positioning module 330 may calculate a position of the vehicle using map information.

According to an exemplary embodiment of the present disclosure, when it is determined that the accuracy of the current position of the vehicle is less than the predetermined level using at least one of the GNSS information or the DR information, the positioning module 330 may determine a position of the vehicle using map information. For example, the positioning module 330 may calculate a final position of the vehicle using the map information transmitted from the navigation application 310.

Figure 4:
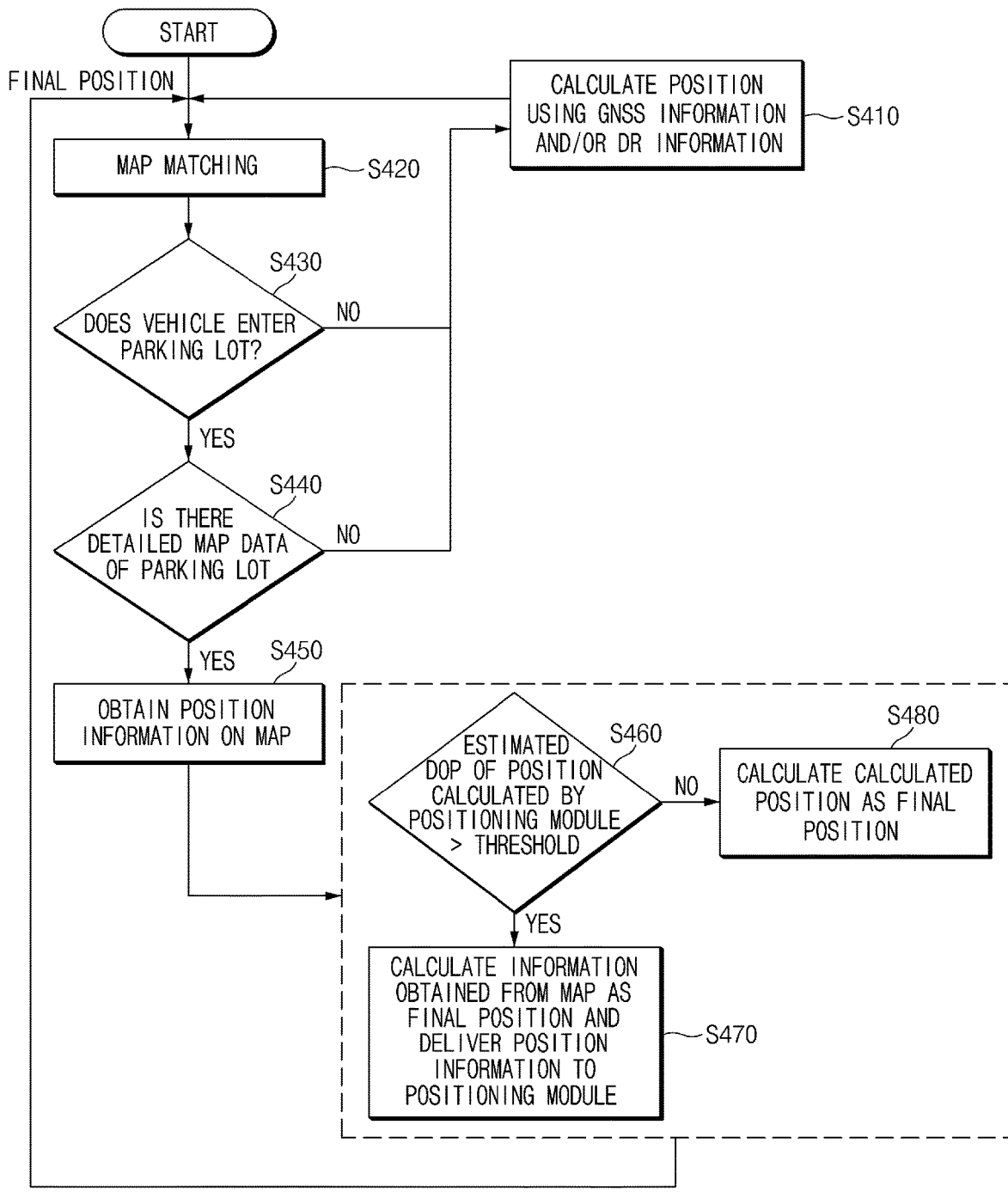
FIG. 4 is a flowchart illustrating determining a position of a vehicle in a vehicle route guidance apparatus and a method thereof according to an exemplary embodiment of the present disclosure.

FIG. 4 is a flowchart illustrating determining a position of a vehicle in a vehicle route guidance apparatus and a method thereof according to an exemplary embodiment of the present disclosure. Operations S410 to S480 in an exemplary embodiment below may be sequentially performed, but are not necessarily sequentially performed. For example, an order of the respective operations may be changed, and at least two operations may be performed in parallel. Contents, which are duplicated with or correspond to the contents described above in conjunction with contents of FIG. 4, may be briefly described or omitted.

Referring to FIG. 4, in a vehicle route guidance apparatus and a method thereof according to an exemplary embodiment of the present disclosure, in S410, a processor is configured to calculate a position of the vehicle using GNSS information or DR information by a positioning module.

According to an exemplary embodiment of the present disclosure, the processor is configured to calculate a position of the vehicle by the positioning module, irrespective of whether a navigation application is run.

For example, the processor is configured to calculate a position of the vehicle using the GNSS information and/or the DR information before or after the vehicle enters a parking lot, by the positioning module.

According to an exemplary embodiment of the present disclosure, when accuracy of the GNSS information is greater than or equal to a predetermined level, the processor is configured to calculate a position of the vehicle using the GNSS information by the positioning module.

According to an exemplary embodiment of the present disclosure, when the accuracy of the GNSS information is less than the predetermined level, the processor is configured to calculate a position of the vehicle using the DR information by the positioning module.

According to an exemplary embodiment of the present disclosure, the processor may deliver information related to the position of the vehicle, which is calculated using the at least one of the GNSS information or DR information by the positioning module, to the navigation application. According to an exemplary embodiment of the present disclosure, the information related to the position of the vehicle may include coordinates and/or heading information.

According to an exemplary embodiment of the present disclosure, in S420, the processor is configured to perform map matching based on the information delivered from the positioning module by the navigation application.

According to an exemplary embodiment of the present disclosure, the processor is configured to calculate a current position in map information, based on the information transmitted from the positioning module by the navigation application.

In detail, the processor may display (or update or correct) coordinates transmitted from the positioning module on a map to verify (or identify) a current position of the vehicle by the navigation application.

According to an exemplary embodiment of the present disclosure, in S430, the processor is configured to calculate whether the vehicle enters a parking lot by the navigation application.

According to an exemplary embodiment of the present disclosure, the processor is configured to calculate whether the vehicle enters the parking lot or is in a state where it enters the parking lot, based on the current position of the vehicle, which is verified (or identified) by the navigation application.

According to an exemplary embodiment of the present disclosure, when it is not determined that the vehicle enters the parking lot (NO of S430), the processor may return to S410 to continue determining a position of the vehicle using GNSS information and DR information by the positioning module.

According to an exemplary embodiment of the present disclosure, when it is determined that the vehicle enters the parking lot (YES of S430), in S440, the processor is configured to determine whether there is detailed map data of the parking lot the vehicle enters.

According to an exemplary embodiment of the present disclosure, the processor is configured to determine whether detailed map data of the parking lot the vehicle enters is stored in a memory. According to an exemplary embodiment of the present disclosure, the processor is configured to determine whether it is able to obtain detailed map data of the parking lot the vehicle enters from the outside thereof through a communication device.

According to an exemplary embodiment of the present disclosure, when it is not determined that there is the detailed map data of the parking lot the vehicle enters (NO of S440), the processor may return to S410 to continue determining a position of the vehicle using GNSS information and DR information by the positioning module.

According to an exemplary embodiment of the present disclosure, when it is determined that there is the detailed map data of the parking lot the vehicle enters (YES of S440), in S450, the processor may obtain position information of the vehicle on the map.

According to an exemplary embodiment of the present disclosure, when it is determined that there is the detailed map data of the parking lot the vehicle enters in the memory, the processor may obtain position information of the vehicle on the map using the detailed map data obtained from the memory.

According to an exemplary embodiment of the present disclosure, when it is determined that it is able to obtain the detailed map data of the parking lot the vehicle enters from the outside thereof through the communication device, the processor may obtain position information of the vehicle on the map using the detailed map data obtained from the outside.

According to an exemplary embodiment of the present disclosure, the processor may deliver the obtained position information of the vehicle on the map to the positioning module.

According to an exemplary embodiment of the present disclosure, in S460, the processor is configured to determine whether an estimated dilution of precision (DOP) of the position calculated by the positioning module is greater than a threshold.

According to an exemplary embodiment of the present disclosure, the processor is configured to determine accuracy of the position based on the estimated DOP of the position calculated by the positioning module.

According to an exemplary embodiment of the present disclosure, the accuracy may be provided as a protection level and may be displayed as a maximum possible DOP up to a specified confidence level. For example, the accuracy may be displayed as a maximum DOP for ensuring a specific probability (e.g., 95%) of reliability.

According to an exemplary embodiment of the present disclosure, when it is determined that the estimated DOP of the position calculated by the positioning module is greater than the threshold (YES of S460), in S470, the processor is configured to calculate a final position of the vehicle using the information obtained from the map and may deliver the calculated final position to the positioning module.

According to an exemplary embodiment of the present disclosure, when it is determined that the estimated DOP of the position calculated by the positioning module is greater than the threshold (YES of S460), the processor is configured to determine that the accuracy of the position calculated by the positioning module is less than a predetermined level and may determine a final position of the vehicle using coordinate information transmitted from the navigation application.

According to an exemplary embodiment of the present disclosure, when it is determined that the estimated DOP of the position calculated by the positioning module is less than or equal to the threshold (NO of S460), in S480, the processor is configured to calculate the position calculated by the positioning module as the final position of the vehicle.

According to an exemplary embodiment of the present disclosure, when it is determined that the estimated DOP of the position calculated by the positioning module is less than or equal to the threshold (NO of S460), the processor is configured to determine that the accuracy of the position calculated by the positioning module is greater than or equal to the predetermined level and may determine the position calculated by the positioning module as the final position of the vehicle, without using the coordinate information transmitted from the navigation application.

According to an exemplary embodiment of the present disclosure, the processor may deliver the final position (e.g., the finally calculated coordinates) of the vehicle, which is obtained according to the result of determining whether the estimated DOP of the position calculated by the positioning module is greater than the threshold, to the navigation application to perform route guidance.

Figure 5:
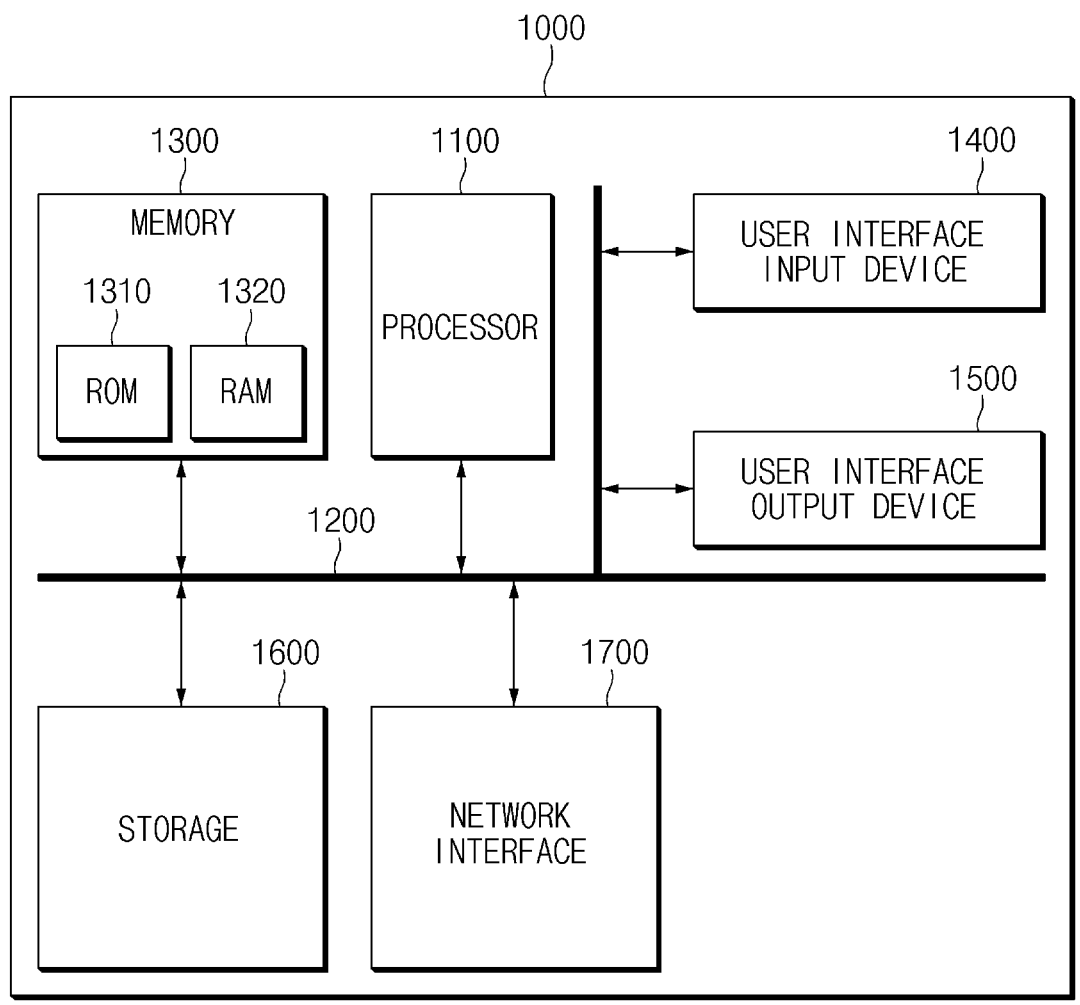
FIG. 5 illustrates a computing system about a vehicle route guidance apparatus and a method thereof according to an exemplary embodiment of the present disclosure.

FIG. 5 illustrates a computing system about a vehicle route guidance apparatus and a method thereof according to an exemplary embodiment of the present disclosure.

Referring to FIG. 5, a computing system 1000 about the vehicle route guidance apparatus and the method thereof may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be provided of effects of the vehicle route guidance apparatus and the method thereof according to an exemplary embodiment of the present disclosure.

According to at least one of embodiments of the present disclosure, the vehicle route guidance apparatus may accurately perform route guidance even when using a low-cost sensor by use of precise map data, thus reducing the cost of the product.

Furthermore, according to at least one of embodiments of the present disclosure, the vehicle route guidance apparatus may guide the driver to a parking position along a final destination.

Furthermore, according to at least one of embodiments of the present disclosure, the vehicle route guidance apparatus may accurately identify a position of the vehicle in the parking lot, thus effectively guiding the driver to an exit of the parking lot.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle route guidance apparatus, comprising:
a positioning module configured to calculate a position of a vehicle; and
at least one processor operatively connected to the positioning module and configured to control the positioning module,
wherein the at least one processor is configured to verify whether the vehicle enters a predetermined section containing at least one parking lot, in a state where a navigation application is run, to calculate accuracy of a position calculated by the positioning module, in a state where the vehicle enters the predetermined section, to perform determination of whether to calculate a final position of the vehicle using map data of the predetermined section, according to a result of determining the accuracy of the position calculated by the positioning module, to calculate the final position of the vehicle by the positioning module, according to the determination, and to perform route guidance of the vehicle on the predetermined section based on the final position,
wherein the at least one processor is configured to determine the accuracy, based on a dilution of precision (DOP) of the position calculated by the positioning module and to calculate the final position using the map data of the parking lot by the positioning module, when the DOP of the position calculated by the positioning module is greater than a threshold, and
wherein the map data of the parking lot include a high definition map where a link in the parking lot is constructed and where pieces of information of passages in the parking lot are recorded.

2. The vehicle route guidance apparatus of claim 1, further including:
a memory operatively connected to the at least one processor,
wherein the at least one processor is configured to determine whether the map data of the predetermined section is stored in the memory, in response that the vehicle enters the predetermined section, and to deliver the map data including the position of the vehicle to the positioning module to calculate the final position, when the at least one processor concludes that the map data of the predetermined section is stored in the memory, and
wherein the map data includes link information of the predetermined section.

3. The vehicle route guidance apparatus of claim 1, wherein the at least one processor is configured to determine the accuracy, based on the DOP of the position calculated by the positioning module and to determine the position calculated by the positioning module as the final position, when the DOP of the position calculated by the positioning module is less than or equal to the threshold.

4. The vehicle route guidance apparatus of claim 1, wherein the at least one processor is configured to calculate the position of the vehicle, using at least one of global navigation satellite system (GNSS) information or dead reckoning (DR) information by the positioning module.

5. The vehicle route guidance apparatus of claim 4, wherein the at least one processor is configured to calculate the position of the vehicle using the GNSS information when accuracy of the GNSS information is greater than or equal to a predetermined level, by the positioning module and to calculate the position of the vehicle using the DR information when the accuracy of the GNSS information is less than the predetermined level, by the positioning module.

6. The vehicle route guidance apparatus of claim 1, wherein the at least one processor is configured to transmit the final position from the positioning module to the navigation application and to perform the route guidance based on the final position transmitted to the navigation application.

7. The vehicle route guidance apparatus of claim 1, wherein the at least one processor is configured to calculate the position of the vehicle irrespective of whether the navigation application is run, by the positioning module, and to transmit the calculated position of the vehicle from the positioning module to the navigation application, irrespective of whether the navigation application is run, to perform map matching in the navigation application.

8. The vehicle route guidance apparatus of claim 1,
wherein the map data includes at least one of entry information, exit information, or passage information of the predetermined section, and
wherein the at least one processor is configured to perform the route guidance on the predetermined section, based on at least one of a final destination, the entry information, the exit information, or the passage information, in response to an input for setting the final destination.

9. A vehicle route guidance method, comprising:
verifying, by at least one processor, whether a vehicle enters a predetermined section containing at least one parking lot, in a state where a navigation application is run;
determining, by the at least one processor, accuracy of a position calculated by a positioning module which calculates a position of the vehicle, in a state where the vehicle enters the predetermined section;
performing, by the at least one processor, determination of whether to calculate a final position of the vehicle using map data of the predetermined section, according to a result of determining the accuracy;
determining, by the at least one processor, the final position of the vehicle by the positioning module, according to the determination; and
performing, by the at least one processor, route guidance of the vehicle on the predetermined section based on the final position,
wherein the at least one processor is configured to determine the accuracy, based on a dilution of precision (DOP) of the position calculated by the positioning module and to calculate the final position using the map data of the parking lot by the positioning module, when the DOP of the position calculated by the positioning module is greater than a threshold, and
wherein the map data of the parking lot include a high definition map where a link in the parking lot is constructed and where pieces of information of passages in the parking lot are recorded.

10. The vehicle route guidance method of claim 9, further including:
determining, by the at least one processor, whether the map data of the predetermined section is stored in a memory operatively connected to the at least one processor, in response that the vehicle enters the predetermined section; and
delivering, by the at least one processor, the map data including the position of the vehicle to the positioning module to calculate the final position, when the at least one processor concludes that the map data of the predetermined section is stored in the memory,
wherein the map data includes link information of the predetermined section.

11. The vehicle route guidance method of claim 9, wherein the determining of the final position of the vehicle by the positioning module by the at least one processor includes:
determining, by the at least one processor, the accuracy, based on the DOP of the position calculated by the positioning module; and
determining, by the at least one processor, the position calculated by the positioning module as the final position, when the DOP of the position calculated by the positioning module is less than or equal to the threshold.

12. The vehicle route guidance method of claim 9, wherein the determining of the accuracy of the position calculated by the positioning module by the at least one processor includes:
determining, by the at least one processor, the accuracy of the position calculated using at least one of global navigation satellite system (GNSS) information or dead reckoning (DR) information by the positioning module.

13. The vehicle route guidance method of claim 12, wherein the determining of the accuracy of the position calculated by the positioning module by the at least one processor includes:
determining, by the at least one processor, the accuracy of the position calculated using the GNSS information when accuracy of the GNSS information is greater than or equal to a predetermined level, by the positioning module; and
determining, by the at least one processor, the accuracy of the position calculated using the DR information when the accuracy of the GNSS information is less than the predetermined level, by the positioning module.

14. The vehicle route guidance method of claim 9, wherein the performing of the route guidance of the vehicle on the predetermined section based on the final position by the at least one processor includes:
transmitting, by the at least one processor, the final position from the positioning module to the navigation application; and
performing, by the at least one processor, the route guidance based on the final position transmitted to the navigation application.

15. The vehicle route guidance method of claim 9, further including:
determining, by the at least one processor, the position of the vehicle irrespective of whether the navigation application is run, by the positioning module; and
transmitting, by the at least one processor, the calculated position of the vehicle from the positioning module to the navigation application, irrespective of whether the navigation application is run, to perform map matching in the navigation application.

16. The vehicle route guidance method of claim 9, wherein the map data includes at least one of entry information, exit information, or passage information of the predetermined section, and
wherein the performing of the route guidance of the vehicle on the predetermined section based on the final position includes performing, by the at least one processor, the route guidance on the predetermined section, based on at least one of a final destination, the entry information, the exit information, or the passage information, in response to an input for setting the final destination.

* * * * *